United States Patent [19]

Degnan, Jr. et al.

[11] Patent Number: 4,683,052
[45] Date of Patent: Jul. 28, 1987

[54] METHOD FOR NON-OXIDATIVE HYDROGEN REACTIVATION OF ZEOLITE DEWAXING CATALYSTS

[75] Inventors: Thomas F. Degnan, Jr., Yardley, Pa.; George R. Landolt, Audubon, N.J.

[73] Assignee: Mobil Oil Corporation, New York, N.Y.

[21] Appl. No.: 817,372

[22] Filed: Jan. 9, 1986

Related U.S. Application Data

[63] Continuation-in-part of Ser. No. 743,463, Jun. 11, 1985, abandoned.

[51] Int. Cl.⁴ .................. B01J 29/38; B01J 38/10; C10G 45/62; C10G 45/64
[52] U.S. Cl. .................. 208/111; 208/120; 502/53
[58] Field of Search .................. 208/120, 111; 502/53, 502/66

[56] References Cited

U.S. PATENT DOCUMENTS

| | | | |
|---|---|---|---|
| Re. 28,398 | 4/1975 | Chen et al. | 208/111 |
| 3,210,265 | 10/1965 | Garwood | 208/111 |
| 3,238,120 | 3/1966 | Sale | 208/111 |
| 4,247,388 | 1/1981 | Banta et al. | 208/111 |
| 4,283,272 | 8/1981 | Garwood et al. | 208/59 |
| 4,358,395 | 11/1982 | Haag et al. | 585/408 |
| 4,404,118 | 9/1983 | Herskovits | 208/305 |
| 4,414,097 | 11/1983 | Chester et al. | 208/59 |
| 4,419,218 | 12/1983 | Angevine et al. | 208/111 |
| 4,441,991 | 4/1984 | Dwyer et al. | 208/111 |
| 4,474,618 | 10/1984 | Yen et al. | 208/111 |
| 4,610,779 | 9/1986 | Markley et al. | 208/112 |

*Primary Examiner*—Olik Chaudhuri
*Attorney, Agent, or Firm*—A. J. McKillop; M. G. Gilman; L. P. Hobbes

[57] ABSTRACT

A method is described for non-oxidatively reactivating coked dewaxing catalyst comprising a zeolite component such as ZSM-5 or zeolite beta. Use of a noble metal as a hydrogenation component associated with the zeolite component, preferably palladium, results in a catalyst which is readily reactivatable by contact with hydrogen at elevated temperatures.

19 Claims, 4 Drawing Figures

EFFECT OF METAL FUNCTION ON COKE DEPOSITION

FIG. 2

——— Ni/ZSM-5
— — Pt/ZSM-5
----- Pd/ZSM-5

$H_2$ REACTIVATION ON Ni-ZSM-5

FIG. 3

——— Coke After Deoiling in Helium
----- Coke After $H_2$ Reactivation

FIG. 4

METHOD FOR NON-OXIDATIVE HYDROGEN REACTIVATION OF ZEOLITE DEWAXING CATALYSTS

This case is a continuation-in-part of U.S. application Ser. No. 743,463, filed June 11, 1985, now abandoned the entire contents of which are incorporated herein by reference.

The present invention relates to a process for non-oxidatively reactivating catalysts. In particular, it relates to regenerating a dewaxing catalyst comprising a noble metal and a zeolite material which has been deactivated by carbonaceous buildup or poisoning. Catalysts which may be regenerated by the process of the present invention include those that have become deactivated during hydrocarbon hydroprocessing, such as catalytic dewaxing of hydrocarbon feedstocks.

In recent years techniques have become available for catalytic dewaxing of petroleum stocks. A process of that nature developed by British Petroleum is described in The Oil and Gas Journal dated Jan. 6, 1975, at pages 69–73. See also U.S. Pat. No. 3,668,113, incorporated herein by reference.

In U.S. Pat. No. Re. 28,398, incorporated herein by reference, is described a process for catalytic dewaxing with a catalyst comprising zeolite ZSM-5. Such process combined with catalytic hydrofinishing is described in U.S. Pat. No. 3,894,938, also incorporated herein by reference.

In U.S. Pat. No. 4,137,148 is described a process for preparing specialty oils of very low pour point and excellent stability from a waxy crude oil distillate fraction by solvent refining, catalytic dewaxing over a zeolite catalyst such as ZSM-5 and hydrotreating, under specified conditions. The entire contents of that patent are incorporated herein by reference.

Hydrocarbon lubricating oils have been obtained by a variety of processes in which high boiling fractions are contacted with hydrogen in the presence of hydrogenation-dehydrogenation catalysts at elevated temperatures and pressures. One such process is disclosed in U.S. Pat. No. 3,755,145, incorporated herein by reference, relating to catalytic lube dewaxing using a shape-selective zeolite catalyst, a large pore cracking catalyst such as clay or silica, and a hydrogenation/dehydrogenation catalyst. In U.S. Pat. No. 4,181,598, incorporated herein by reference, a lube base stock oil of high stability is produced from a waxy crude oil fraction by solvent refining, catalytic dewaxing over a shape-selective zeolite catalyst and hydrotreating under specified conditions.

Group VIII metals such as Ni, Pt and Pd are known as useful hydrogenation components in zeolitic catalytic dewaxing catalysts. Generally Ni has been preferred owing to its lower cost.

As a catalytic dewaxing catalyst is used, carbonaceous deposits form thereon resulting in a reduction of catalytic activity. Various methods of regenerating Group VIII metal-containing catalysts are known. Such processes include oxidation, reduction and halogenation treatments. The present invention relates to a non-oxidative method of regenerating a zeolitic dewaxing catalyst which comprises an elevated temperature hydrogen treatment step.

U.S. Pat. No. 3,210,265 to Garwood, incorporated herein by reference, teaches hydrogen regeneration at high temperatures of a hydrocracking catalyst comprising a hydrogenation component, e.g., Group VIII materials combined with an acidic cracking component such as a crystalline aluminosilicate. Although Group VIII metals are taught as hydrogenation components no advantage is taught in using noble metals over Group VIII metals such as nickel or cobalt. Hydrogen regeneration of zeolite catalysts of 0.43 wt. % Pt, 2 wt. % Pt and 7.6 wt. % Ni at high pressures are exemplified therein. U.S. patent application Ser. No. 709,858 filed on Mar. 8, 1985 and incorporated herein by reference, discloses an oxidative method of regenerating a zeolite beta dewaxing catalyst containing palladium.

U.S. Pat. No. 4,358,395 to Haag et al discloses zeolite catalyst regeneration in which a zeolite catalyst is contacted with oxygen, then precoked under controlled conditions and then contacted with hydrogen gas under controlled conditions. This process has the drawback of requiring a precoking step.

It has now been found that metal-containing shape-selective zeolite dewaxing catalysts, such as ZSM-5, not only accumulate less coke during dewaxing but are more easily regenerated at pressures less than about 1000 psig when the hydrogenation metal is a noble metal, e.g., Pt or Pd, especially Pd.

Catalyst regeneration employing hydrogen may be conducted either in situ within a reactor or outside of the reactor. Offsite regeneration may comprise contacting a thin layer of catalyst on a moving belt with hydrogen. Offsite regeneration is often desirable because it allows regeneration at high temperature without danger of temperature runaway in the reactor. Also, impurities are removed from the catalyst layer without having to contact other catalyst downstream in the same layer, as is the case for in situ regeneration.

Hydrogen reactivation has been found to be particularly effective in reactivating deactivated hydrocarbon conversion catalysts. This reactivation process can readily restore deactivated acid sites on aged catalysts as well as restoring their diffusion and sorption properties. Because hydrogen reactivation is considerably faster than oxidation procedures, the former is particularly desirable in processes such as catalytic lube dewaxing which generally require a frequent catalyst reactivation. Because much of the catalyst deactivation is attributable to the buildup of carbonaceous residue such as coke on the catalyst, it is imperative that at least some of the coke be removed therefrom. Preferably, a reactivated catalyst should contain no more than about 10, 5, 2, or preferably about 1 weight percent of carbonaceous deposits after reactivation. However, it has been found that conventional dewaxing catalysts such as NiZSM-5 require very high temperatures during hydrogen reactivation, e.g., greater than 540° C., or inordinately long regeneration periods, or both to reduce coke content to an acceptable level. Because exposure of the dewaxing catalyst to inordinately high temperature can cause structural damage to the catalyst, as well as hydrogenation component agglomeration, methods other than hydrogen reactivation have frequently been employed to reactivate zeolitic dewaxing catalysts.

The present invention relates to a method for non-oxidatively hydrogen reactivating a coked dewaxing catalyst. The catalyst comprises a noble metal, an inorganic oxide binder and a zeolite component having a constraint index ranging from about 1 to 12 and a silica-to-alumina molar ratio of at least about 12. The coked dewaxing catalyst is reactivated by contacting with hydrogen at a hydrogen pressure less than about 7000 kPa (1000 psig). The method comprises utilizing a noble metal-containing dewaxing catalyst with a zeolite component. The noble metal may be selected from the group consisting of platinum, palladium, iridium, ruthenium, rhodium, and osmium. In particular, the noble metal may be platinum, palladium or a mixture of the two. Use of the noble metal increases the extent of coke removal from the catalyst and permits hydrogen reactivation to proceed at lower temperatures than required in conventional nickel-containing catalysts. The hydrogen reactivation may be carried out at temperatures of about 315° to 538° C., preferably about 371° to 454° C., say about 460° to 538° C. Hydrogen pressures employed in the reactivation may range from about 791 to 6996 kPa (100 to 1000 psig) $H_2$, preferably about 2170 to 3548 kPa (300 to 500 psig), say about 2170 to 3195 kPa (300 to 450 psig). Where palladium is employed, the maximum rate of coke removal may be obtained at temperatures less than 500° C, for example, between about 315° to 482° C. Accordingly, the present invention permits optimal rates of coke removal at lower temperatures, e.g., about 100° C. lower than an equivalent nickel-containing zeolitic catalyst.

In another embodiment, the present invention relates to a method for catalytic dewaxing of a hydrocarbon feedstock containing straight chain paraffins. The feedstock may be contacted under dewaxing conditions with a catalyst comprising less than about 10, 5, 2, or even 1 weight percent noble metal, an inorganic oxide binder and a zeolite having a constraint index ranging between about 1 and 12 and a silica-to-alumina molar ratio of at least about 12. A dewaxed effluent product stream is thus produced comprising greater than about 80, 85 or even 90 volume percent of hydrocarbons having a boiling point greater than about 200°, 230°, or even 315° C., at atmospheric pressure. The dewaxing results in coking of the catalyst which is reactivated by contact with hydrogen gas at temperatures between about 315° C. to 482° C. or even 538° C. and pressures from about 791 to 6996 kPa (100 to 1000 psig). Such contact is preferably maintained for a time sufficient to substantially restore the activity of the dewaxing catalyst.

The present invention relates to a process employing a catalyst comprising noble metal, such as platinum or palladium, preferably palladium, and a zeolite having a constraint index ranging from about 1 to 12, and silica-to-alumina mole ratio of at least about 12. The process includes the steps of catalytically dewaxing a hydrocarbon feedstock and non-oxidatively regenerating the catalyst by hydrogen reactivation, to provide a catalyst of lower carbonaceous residue content and enhanced activity.

The reactivation procedure of the present invention utilizes hydrogen, with any remainder being an inert gas, such as nitrogen, carbon monoxide or carbon dioxide, from fuel processing streams located in a typical refinery. Regeneration of the coked catalyst material is achieved by contacting it with hydrogen under suitable reactivation conditions. These include temperatures ranging from about 315° to 538° C. (600° to 1000° F.), preferably about 371° to 454° C. (700° to 850° F.), and contact times ranging from about 1 to 48 hours, preferably about 5 to 24 hours, such that the catalyst coke content is reduced to less than 10, 5, 2 or even 1 weight percent of the catalyst. The hydrogen treatment step is carried out at pressures ranging from about 791 to 6996 kPa (100 to 1000 psig), preferably about 2170 to 3548 kPa (300 to 500 psig). The hydrogen feed rate may range from about 0.2 to 400 standard liters per hour per gram of catalyst, preferably about 2 to 50 standard liters per hour per gram of catalyst. Hydrogen may be taken from any hydrogen stream in a refinery, such as recycle streams or streams from a steam reformer. Typically, the refinery streams will have a hydrogen concentration of greater than 50 volume percent, with the remainder being inert gas. Preferably, the reactivating agent forms a stream containing greater than 70 volume percent hydrogen ($H_2$), with the remainder being inert gas.

Figure 1:
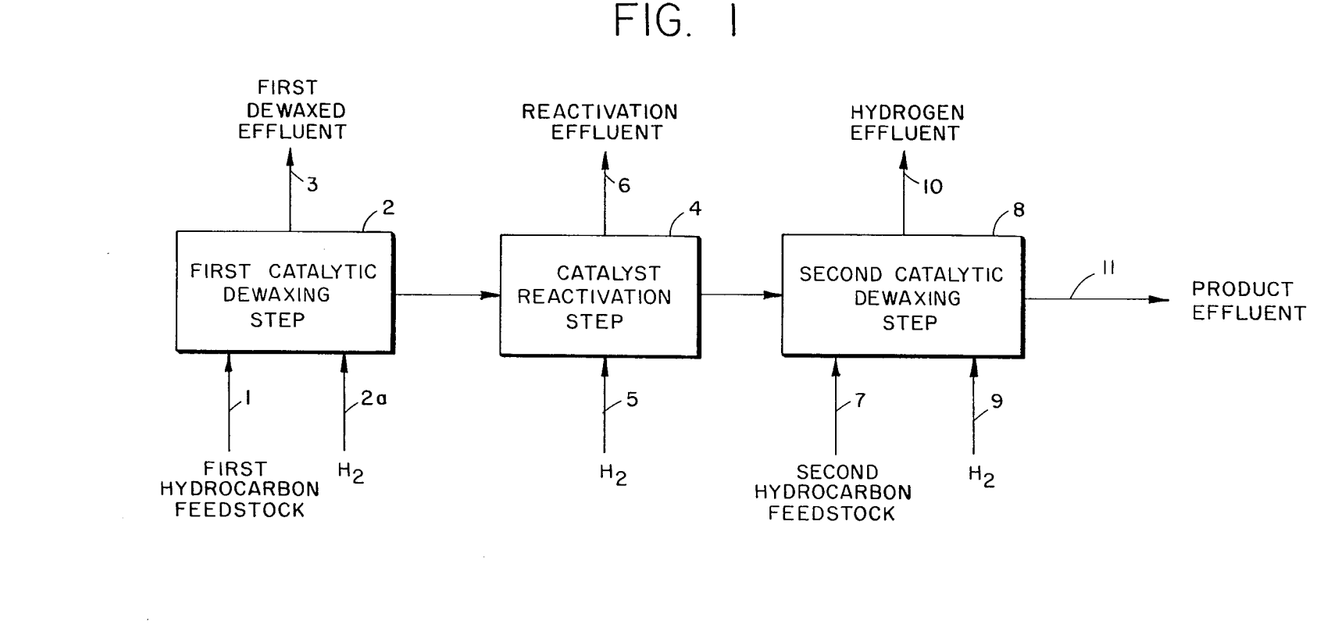
FIG. 1 depicts a schematic of the method of the present invention.

The noble metal-containing catalyst, which can be regenerated by the regeneration process described above, is preferably incorporated into a cyclic dewaxing, regeneration process, as shown by FIG. 1. The dewaxing conditions may include a temperature from about 232° to 454° C. (450° to 850° F.), a pressure of about 791 to 6996 kPa (100 to 1000 psig), and a space velocity from about 0.1 to 20 LHSV. The hydrogen feed rate generally ranges from about $3 \times 10^5$ to $3 \times 10^6$ liters per liter (1,000 to 10,000 scfb). For lube dewaxing, conditions may include a temperature ranging from about 249° to 399° C. (480° to 700° F.), a pressure ranging from about 791 to 6996 kPa (100 to 1000 psig), a space velocity ranging from about 0.2 to 5 LHSV, and a hydrogen feed rate ranging from about $3 \times 10^5$ to $3 \times 10^6$ liters per liter (1,000 to 10,000 scfb). Lube dewaxing conditions are described in greater detail in U.S. Pat. No. 4,181,598. For distillate dewaxing, conditions may include temperatures ranging from about 288° to 468° C. (550° to 875° F.), pressures of about 791 to 6996 kPa (100 to 1000 psig), a space velocity of about 0.1 to 20 LHSV and a hydrogen feed rate ranging from about $3 \times 10^5$ to $3 \times 10^6$ liters per liter (1000 to 10,000 scfb). Preferably, said temperatures range from about 315° to 427° C. (600° to 800° F.). Said pressures range from about 1477 to 4229 kPa (200 to 600 psig), said space velocity ranges from about 0.25 to 4.0 LHSV and said hydrogen feed rate ranges from about $3 \times 10^5$ to $3 \times 10^6$ liters per liter (1,000 to 10,000 scfb) U.S. Pat. No. 4,419,220, incorporated herein by reference gives further details of distillate dewaxing.

The process of the present invention is particularly suited to dewaxing hydrocarbon feedstocks containing straight chain paraffins to form an effluent stream containing greater than about 80 volume percent of product having a boiling point at atmospheric pressure greater than about 200° C., preferably above about 230° C. or even 315° C. Such product is particularly useful as lube base stock.

Prior to dewaxing, a preliminary hydrotreating step to remove nitrogen and sulfur and to saturate aromatics to naphthenes without substantial boiling range conversion will usually improve catalyst performance and permit lower temperatures, higher space velocities, lower pressures, or combinations of these conditions, to be employed. However, care should be taken to remove the lighter products including hydrogen sulfide and ammonia prior to dewaxing in order to avoid poisoning of the dewaxing catalyst.

With reference to FIG. 1, the dewaxing and regeneration process would include catalytically dewaxing a first stream of hydrocarbon feedstock 1 comprising waxy components in a first catalyst dewaxing step 2, by contact with a stream of hydrogen 2a in the presence of the catalyst under the dewaxing conditions described above to produce a first dewaxed effluent stream 3 having a desired pour point. Preferably, the pour point is less than about 0° C. for lubes and about −17° C. for distillates. The dewaxing may continue until the catalyst is substantially deactivated. Deactivation is indicated when the catalyst cannot produce an effluent having the desired pour point at the above-described conditions.

The deactivated catalyst is then non-oxidatively regenerated by catalyst reduction step 4, in which a hydrogen-containing stream 5 contacts the catalyst and thereafter emerges as effluent stream 6, at suitable conditions as described above.

The regenerated catalyst may then be employed for catalytically dewaxing a second stream of the waxy hydrocarbon feedstock 7 in a second catalytic dewaxing step 8, by contact with the regenerated catalyst under the dewaxing conditions of step 2. Hydrogen may be provided by a hydrogen stream 9 which thereafter emerges as effluent 10, while the dewaxed product exits the step as product effluent 11.

The dewaxing catalyst used in the method of the present invention may be used to dewax a variety of feedstocks ranging from relatively light distillate fractions up to high boiling stocks, such as whole crude petroleum, reduced crudes, vacuum tower residua, cycle oils, FCC tower bottoms, gas oils, vacuum gas oils, deasphalted residua and other heavy oils. The feedstock will normally be a $C_{10}^+$ feedstock, since lighter oils will usually be free of significant quantities of waxy components. The process is particularly useful with waxy distillate stocks, such as gas oils, kerosenes, jet fuels, lubricating oil stocks, heating oils and other distillate fractions whose pour point, freeze point, and cloud point need to be reduced to certain specification levels. Lubricating oil stocks will generally boil above 230° C. (450° F.), more usually above 315° C. (600° F.). Hydrotreated stocks are a convenient source of these materials as well as other distillate fractions since they normally contain significant amounts of waxy n-paraffins which have been produced by the removal of polycyclic aromatics.

The catalyst used in the process comprises a crystalline zeolite material which may be shape-selective. Zeolitic materials, both natural and synthetic, have been demonstrated in the past to have catalytic properties for various types of hydrocarbon conversion. Certain zeolitic materials include ordered, porous crystalline metallosilicates or metallogermanates having a definite crystalline structure as determined by X-ray diffraction, within which there are a large number of small cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline materials such as aluminosilicates. These materials can be described as a rigid three-dimensional framework of $XO_4$ and $YO_4$ wherein X is silicon and/or germanium, and Y is one or more of aluminum, gallium, iron, chromium, vanadium, molybdenum, arsenic, manganese, or boron. This framework is comprised of tetrahedra which are cross-linked by the sharing of oxygen atoms whereby the ratio of the total Y and X atoms to oxygen atoms is 1:2. The electrovalence of the tetrahedra containing Y, e.g. aluminum, is balanced by the inclusion in the crystal of a cation, for example an alkali metal or an alkaline earth metal cation. This can be expressed wherein the ratio of Y to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given zeolite by suitable selection of the cation. The spaces between the tetrahedra are occupied by molecules of water prior to dehydration.

The crystalline zeolites utilized by the method of the present invention are members of a special class of zeolitic materials which exhibit unusual properties. Although these zeolites have unusually low Y atom contents, i.e., high X to Y mole ratios, e.g., high silica-to-alumina molar ratios, they are very active even when the X to Y mole ratio exceeds 30. The activity is surprising, since catalytic activity is generally attributed to framework Y atoms and/or cations associated with these atoms. These zeolites retain their crystallinity for long periods in spite of the presence of steam at high temperatures which induces irreversible collapse of the framework of other zeolites, e.g., of the X and A type.

An important characteristic of the crystal structure of these zeolites is that they provide constrained access to, and egress from, the intracrystalline free space by virtue of having a pore dimension greater than about 5 Angstroms and pore windows of about a size such as would be provided by 10 membered rings of oxygen atoms. It is to be understood, of course, that these rings are those formed by the regular disposition of the tetrahedra making up the anionic framework of the crystalline silicate, the oxygen atoms themselves being bonded to the silicon or aluminum atoms at the centers of the tetrahedra. Briefly, the preferred zeolites useful in this invention possess, in combination: an $XO_4$ to $YO_4$ mole ratio, e.g., a silica to alumina mole ratio, of at least about 12; and a structure providing constrained access to the crystalline free space.

The zeolites useful in this invention freely sorb normal hexane and preferably have a pore dimension greater than about 5 Angstroms. In addition, their structure must provide constrained access to some larger molecules. It is sometimes possible to judge from a known crystal structure whether such constrained access exists. For example, if the only pore windows in a crystal are formed by 8-membered rings, then access by molecules of larger cross-section than normal hexane is substantially excluded and the zeolite is not of the desired type. Zeolites with windows of 10-membered rings are preferred, although excessive puckering or pore blockage may render these zeolites substantially ineffective.

Rather than attempt to judge from crystal structure whether or not a zeolite possesses the necessary constrained access, a simple determination of the "constraint index" may be made by continuously passing a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. (1000° F.) for at least 15 minutes. The zeolite is then flushed with helium and the temperature adjusted between 290° C. and 510° C. (550° F. and 950° F.) to give an overall conversion between 10 and 60 percent. The mixture of hydrocarbons is passed at 1 liquid hourly space velocity (i.e., 1 volume of liquid hydrocarbon per volume of catalyst per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log 10 \text{ (fraction of n-hexane remaining)}}{\log 10 \text{ (fraction of 3-methylpentane remaining)}}$$

The constraint index approximates the ratio of the cracking rate constants for the two hydrocarbons. Catalysts suitable for the present invention are those which employ a zeolite having a constraint index from about 1.0 to 12.0.

Crystalline zeolite material having the structure of zeolite beta, ZSM-5, ZSM-5/ZSM-11 intermediate, ZSM-11, ZSM-12, ZSM-23, ZSM-35, ZSM-38, and ZSM-48 are examples of crystalline silicates for use herein, and are more particularly described in U.S. Pat. Nos. 3,308,069 (zeolite beta), 3,702,886 (ZSM-5), 4,229,424 (ZSM-5/ZSM-11), 3,709,979 (ZSM-11), 3,832,449 (ZSM-12), 4,076,842 (ZSM-23), 4,016,245 (ZSM-11), 4,046,859 (ZSM-38), and 4,375,573 (ZSM-48) respectively, the entire contents of each being incorporated herein by reference.

The zeolitic dewaxing catalyst comprises a hydrogenation-dehydrogenation component. The hydrogenation/dehydrogenation component is a noble metal such as platinum or palladium, preferably palladium.

The metal may be incorporated into the catalyst by any suitable method, such as impregnation or exchange onto the zeolite resulting in intimate association of noble metal with the zeolite. Alternatively, the catalyst may be prepared by physically mixing the metal salt with the zeolite and an inorganic matrix component. The noble metal need not be directly associated with the zeolite component of the catalyst mixture. The metal may be incorporated into the catalyst in the form of a cationic, anionic or neutral complex, such as $Pd(NH_3)_4^{2+}$.

The amount of the noble metal component is less than about 2 weight percent, preferably about 0.1 to 0.9 weight percent, e.g., about 0.3 to 0.6 weight percent of the total catalyst.

It may be desirable to incorporate within the catalyst a non-zeolitic inorganic oxide binder material resistant to the temperature and other conditions employed in the process. Such matrix materials include synthetic or natural substances as well as inorganic materials, such as clay, silica and/or metal oxides. The latter may be either naturally occurring or in the form of gelatinous precipitates. Naturally occurring clays which can be composited with the catalyst include those of the montmorillonite and kaolin families. These clays can be used in the raw state as originally mined or initially subjected to calcination, acid treatment or chemical modification.

The catalyst may be composited with a porous matrix material, such as alumina, silica-alumina, silica-magnesia, silica-zirconia, silica-thoria, silica-beryllia, silica-titania, as well as ternary compositions, such as silica-alumina-thoria, silica-alumina-zirconia, silica-alumina-magnesia, and silica-magnesia-zirconia. The matrix may be in the form of a cogel with the zeolite. The relative proportions of zeolite component and inorganic oxide gel matrix may vary widely, with the zeolite content ranging from between 1 to 99 weight percent, more usually 5 to 80 weight percent of the composite, say about 70 weight percent zeolite and 30 weight percent alumina. The matrix may itself possess catalytic properties, generally of an acidic nature.

This invention will be better understood by reference to the following examples.

EXAMPLES 1 to 3

HZSM-5, NiZSM-5 and PdZSM-5 dewaxing catalysts having the characteristics set out in Table 1 were employed in dewaxing. The HZSM-5 and NiZSM-5 catalysts were steamed to reduce their alpha activity to about 70 as measured by the alpha test set out in U.S. Pat. No. 4,326,994, incorporated herein by reference. All three catalysts were employed in dewaxing heavy neutral or bright stock feeds for at least 30 days.

EXAMPLES 4-6

Hydrogenation Reactivation of Coked Dewaxing Catalysts of Example 1 to 3

The deactivated catalysts of Examples 1 to 3 were each hydrogen reactivated at 482° C. (900° F.) for 24 hours in 4.7 liters of hydrogen per gram of catalyst per hour (75 scf $H_2$ per pound of catalyst per hour), once through hydrogen at 2860 kPa (400 psig). Table 2 compares the residual organic contents and elemental compositions of organic material remaining on the various lube dewaxing catalysts. The amount of organic material remaining on the PdZSM-5 catalyst of Example 3 was considerably less than either the conventional NiZSM-5 catalyst of Example 2 or the HZSM-5 catalyst of Example 1.

EXAMPLES 7 to 9

Preparation of PdZSM-5, PtZSM-5 and NiZSM-5 Catalysts

The Pd catalyst was prepared by physically mixing 0.37 wt % Pd as an aqueous $Pd(NH_3)_4Cl_2$ solution with 65% ZSM-5 and 35% $Al_2O_3$, extruding to 0.16 cm diameter by 0.63 cm long extrudates, drying at 110° C., and then calcining in nitrogen to decompose the organic directing agent, exchanging with an ammonium salt ($NH_4NO_3$), and then calcining in air to 538° C. The Pt containing catalyst was prepared identically except with $Pt(NH_3)_4Cl_2$ as the metal salt. The Ni catalyst was prepared by extruding the 65% ZSM-5/35% $Al_2O_3$ mixture to 0.16 cm by 0.63 cm extrudates, drying at 100°

C., calcining in nitrogen to 538° C., exchanging with the ammonium salt, rinsing with deionized water, exchanging with 0.5 M Ni(NO₃)₂ for 4 hours at 82° C. and calcining in air to 538° C. for three hours. The Ni catalyst used in this example was unsteamed (alpha=170).

TABLE 1-continued

| | | | |
|---|---|---|---|
| 300+ | (36) | 21 | 37 |

[1]Numbers in parentheses are properties before steaming.

TABLE 2

| Feedstock | Bright Stock | Heavy Neutral | Heavy Neutral | Bright Stock | Heavy Neutral and Light Neutral |
|---|---|---|---|---|---|
| Type | HZSM—5 of Example 1 | PdZSM—5 of Example 2 from top of Reactor | PdZSM—5 of Example 2 from bottom of Reactor | NiZSM—5 of Example 3 | NiZSM—5 of Example 3 |
| Residue Analysis Basis = g/100 g Fresh Catalyst | | | | | |
| Carbon | 8.36 | 0.70 | 0.68 | 3.54 | 4.45 |
| Hydrogen | 1.02 | 0.10 | 0.11 | 0.37 | 0.48 |
| Nitrogen | 0.035 | 0.029 | 0.035 | 0.062 | 0.039 |
| Sulfur | — | — | — | 0.05 | 0.014 |
| Total, g/100 g Fresh Catalyst | 9.415 | 0.829 | 0.825 | 4.022 | 4.983 |
| Normalized Composition of Residue | | | | | |
| Carbon, wt % | 88.79 | 84.44 | 82.42 | 88.02 | 89.93 |
| Hydrogen, wt % | 10.83 | 12.06 | 13.33 | 9.20 | 9.64 |
| Nitrogen, ppm | 3717 | 34980 | 42424 | 15415 | 7827 |
| H/C (Atomic) | 1.46 | 1.71 | 1.94 | 1.25 | 1.29 |

Notes:
(1) The catalyst of Example 1 was heated to 130° C. in a vacuum oven to remove n-pentane that was on catalyst from Soxhlet extraction.

EXAMPLE 10

Hydrogen Reactivation of Coked Catalysts From Examples 7 to 9

The coked catalysts of Examples 7 to 9 were deoiled at 482° C. (900° F.) in helium and then analyzed for coke (ignited basis) by thermogravimetric analysis (TGA). As shown in Table 3 the amount of neutral stock desorbed from the catalyst during heat-up in helium is 34 to 37 weight percent. Approximately the same amount of coke, i.e., material remaining immediately after the catalyst has been heated to 482° C. (900° F.), is deposited on the platinum and palladium catalysts, 7.2 and 7.5 weight percent, respectively, compared to the 10.3 weight percent deposited on the Ni catalyst. Thus, there is approximately 30% less coke make on the noble metal containing catalysts.

TABLE 1

| Catalyst Type | 65% HZSM—5 35% Al₂O₃ | 65% NiZSM—5 35% Al₂O₃ | 65% PdZSM—5 35% Al₂O₃ |
|---|---|---|---|
| Extrudate Size, (cm) | 0.16 | 0.16 | 0.16 |
| Nickel, wt % | — | 1.2 | — |
| Palladium, wt % | — | — | 0.6 |
| Alpha Activity | 68 | 68 | about 170 |
| Density, g/cc | | | |
| Packed | (0.59)[1] | 0.59 | 0.54 |
| Particle | (0.89) | 0.93 | 0.89 |
| Real | (2.66) | 2.91 | 2.70 |
| Surface Area, m²/g | (365) | 348 | 346 |
| Average Pore Diameter, A | (92) | 84 | 87 |
| Pore Volume, cc/g | (0.748) | 0.733 | — |
| Pore Size Distribution % of PV in Pores of | | | |
| 0-30 A Diameter | (22) | 23 | 20 |
| 30-50 | (10) | 5 | 9 |
| 50-80 | (9) | 18 | 14 |
| 80-100 | (4) | 10 | 4 |
| 100-150 | (7) | 14 | 8 |
| 150-200 | (4) | 4 | 4 |
| 200-300 | (8) | 5 | 4 |

TABLE 3

Coke Formation on Catalysts During Catalytic Dewaxing of Heavy Neutral Feedstocks

| Catalyst of Example | Metal | Adsorbed Oil Wt % | Adsorbed Oil Temp °C. Max. Desorb Rate | Coke Wt %* | Coke Temp °C. Max. Burn Rate |
|---|---|---|---|---|---|
| Deoiled in He at 482° C. | | | | | |
| 7 | Pd | 36.65 | 355 | 7.53 | 458 |
| 8 | Pt | 35.32 | 350 | 7.18 | 500 |
| 9 | Ni | 34.14 | 355 | 10.30 | 540 |
| H₂ Reactivation at 482° C. | | | | | |
| 7 | Pd | 39.40 | 355 | 3.94 | 470 |
| 8 | Pt | 37.89 | 345 | 3.46 | 510 |
| 9 | Ni | 37.26 | 345 | 5.40 | 580 |

*Ignited Basis

Figure 2:
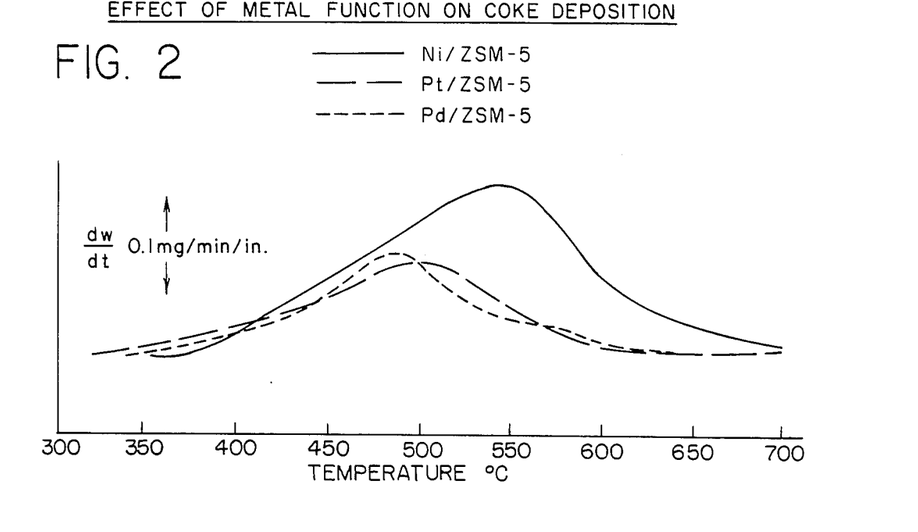
FIG. 2 depicts the effect of metal function on carbonaceous deposition of a ZSM-5 catalyst used in lube dewaxing.

FIG. 2 shows that there is a significant difference in the temperature for maximum rate of coke removal in air. A temperature of 540° C. (1000° F.) is required for maximum rate of coke removal of the helium treated NiZSM-5 catalysts compared to 500° C. (932° F.) for PtZSM-5 and 460° C. (860° F.) for PdZSM-5. This would indicate that the carbonaceous material formed on noble metal catalysts, especially palladium catalysts, is easier to remove by oxygen regeneration as well as hydrogen reactivation. While not wishing to be bound by theory, it is believed that the noble metal not only catalyzes the removal of carbonaceous residues formed but inhibits the formation of highly refractory carbonaceous residues as well.

Figure 3:
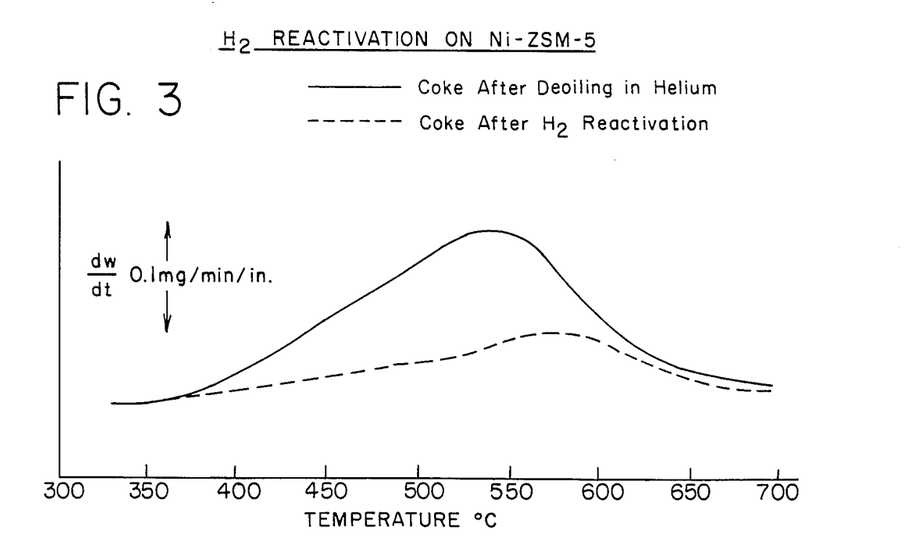
FIG. 3 depicts the effect of deoiling and hydrogen reactivation on NiZSM-5 lube dewaxing catalyst.
Figure 4:
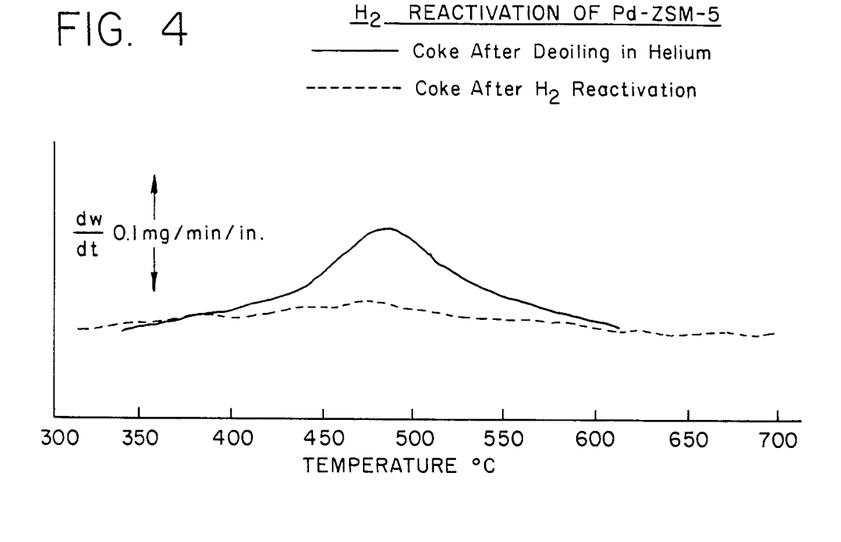
FIG. 4 depicts the effect of deoiling and hydrogen reactivation on PdZSM-5 lube dewaxing catalyst.

Fresh samples of the used catalysts were treated in a thermogravimetric analyser (TGA) with hydrogen for 2 hours at 480° C. (900° F.) and 101.3kPa (1 atmosphere). Comparison of the He and H₂ reactivation data in Table 3 indicates that an additional 50 weight percent of the coke from all three samples was removed during hydrogen reactivation. Platinum and palladium catalysts retained 3.9 and 3.5 weight percent coke respectively after hydrogen reactivation while the Ni catalyst retained 5.4 weight percent coke. As before, the temperature of maximum rate of coke removal for PdZSM-5 is about 100° C (210° F) lower than that of NiZSM-5. However, as shown in FIG. 3, the temperature maximum for coke removal from NiZSM-5 is shifted about 40° C. (72° F.) higher than that observed during the helium reactivation. This suggests that only the hardest coke remained after H₂ reactivation. As shown in FIG. 4, the temperature for maximum rate of coke removal remained about the same after the H₂ and helium reactivation indicating that hydrogen reactivation of the Pd catalyst produced a "softer" coke than processed by hydrogen reactivation of the Ni catalyst. Analysis of the remaining residue as shown in Table 2 substantiates this observation, since the H/C ratio of the coke after lube dewaxing over PdZSM-5 is higher than for NiZSM-5.

The examples show that noble metal catalysts exhibit advantages over conventional nickel or non-metal dewaxing catalysts for hydrogen reactivation in that: (1) less coke remains on the Pd and Pt catalysts after reactivation at equivalent severities, (2) lower temperatures are required to remove the coke from these catalysts and (3) the coke that does remain on the Pt and Pd catalysts is a "softer" coke that should be easier to remove by going to higher temperatures.

It is claimed:

1. A method for non-oxidatively hydrogen reactivating a coked dewaxing catalyst comprising palladium, an inorganic oxide binder and a zeolite component having a constraint index ranging from about 1 to 12 and a silica to alumina molar ratio of at least about 12, which method comprises contacting said coked dewaxing catalyst with hydrogen at a hydrogen pressure less than about 7000 kPa (1000 psig), whereby maximum rate of coke removal from the catalyst is effected at less than 500° C.

2. The method of claim 1 wherein said hydrogen reactivating is carried out at about 315° to 482° C. and a hydrogen pressure ranging from about 791 to 6996 kPa (100 to 1000 psig).

3. The method of claim 1 wherein said hydrogen reactivating is carried out at about 371° to 482° C., and a hydrogen pressure ranging from about 2170 to 3548 kPa (300 to 500 psig).

4. The method of claim 1 wherein said hydrogen reactivating is carried out at about 460° to 500° C. and a hydrogen pressure ranging from about 2510 to 3100 kPa (350 to 450 psig).

5. The method of claim 1 wherein said zeolite is selected from the group consisting of ZSM-5, ZSM-11, ZSM-5/ZSM-11 intermediate, ZSM-12, ZSM-23, ZSM-35, ZSM-38 and ZSM-48.

6. The method of claim 5 wherein said zeolite is ZSM-5.

7. The method of claim 1 wherein said inorganic oxide binder is alumina.

8. The method of claim 1 wherein said catalyst comprises about 70% by weight of said zeolite component and about 30% by weight of an alumina component.

9. A method for catalytically dewaxing a hydrocarbon feedstock containing straight chain paraffins, comprising the following steps:
contacting said feedstock at dewaxing conditions with a catalyst comprising about 0.1 to less than about 2 weight percent palladium, an inorganic oxide binder and a shape selective zeolite having a constraint index ranging between about 1 and 12 and a silica-to-alumina molar ratio of at least about 12 to produce an effluent stream wherein greater than about 80 volume percent of said stream has a boiling point greater than about 230° C. (450° F.), whereby said catalyst becomes coked; and non-oxidatively reactivating said coked catalyst by contacting it with hydrogen gas at a temperature between about 315° to 500° C., and a pressure from about 791 to 6996 kPa (100 to 1000 psig).

10. The method of claim 9 wherein said reactivating occurs at a temperature ranging from about 371° to 482° C., pressure ranging from about 2170 to 3548 kPa (300 to 500 and for a catalyst residence time sufficient to reduce catalyst coke content to less than 10 weight percent of said catalyst.

11. The method of claim 9 wherein said reactivation step occurs at a temperature ranging from about 460° to 500° C., a pressure ranging from about 2510 to 3100 kPa (350 to 450 psig) and for a catalyst residence time sufficient to reduce catalyst coke content to less than 1 weight percent of said catalyst.

12. The method of claim 9 wherein said zeolite is selected from the group consisting of ZSM-5, ZSM-11, ZSM-5/ZSM-11 intermediate, ZSM-12, ZSM-23, ZSM-35, ZSM-38 and ZSM-48.

13. The method of claim 12 wherein said zeolite is ZSM-5.

14. The method of claim 9 wherein said zeolite is composited with an alumina component.

15. The method of claim 9 wherein said catalyst comprises about 70% by weight of said zeolite component and about 30% by weight of an alumina component.

16. The method of claim 9 wherein greater than about 85 volume percent of said effluent stream has a boiling point greater than about 230° C.

17. The method of claim 9 wherein at least about 90 volume percent of said effluent stream has a boiling point greater than about 230° C.

18. The method of claim 1 wherein said palladium is intimately associated with said zeolite component.

19. The method of claim 1 wherein said palladium is physically incorporated into the zeolite-binder mixture.

* * * * *

UNITED STATES PATENT AND TRADEMARK OFFICE
CERTIFICATE OF CORRECTION

PATENT NO. : 4,683,052

DATED : July 28, 1987

INVENTOR(S) : Thomas F. Degnan, Jr. and George R. Landolt

It is certified that error appears in the above-identified patent and that said Letters Patent is hereby corrected as shown below:

Column 12, line 26: after "500" insert --psig)--.

Signed and Sealed this

Ninth Day of February, 1988

Attest:

DONALD J. QUIGG

Attesting Officer      Commissioner of Patents and Trademarks